Aug. 16, 1966 R. T. ADAMS 3,267,380

DIVERSITY PHASE CONTROL SYSTEM USING SUBCARRIER IDENTIFYING SIGNALS

Filed Oct. 19, 1962 2 Sheets-Sheet 1

INVENTOR.
ROBERT T. ADAMS

BY Hopgood and Calimafde

ATTORNEYS

INVENTOR.
ROBERT T. ADAMS
BY Hopgood and Calimafde
ATTORNEYS

United States Patent Office 3,267,380

Patented August 16, 1966

3,267,380

DIVERSITY PHASE CONTROL SYSTEM USING SUBCARRIER IDENTIFYING SIGNALS

Robert T. Adams, Short Hills, N.J., assignor to Sichak Associates, Nutley, N.J., a corporation of New Jersey Filed Oct. 19, 1962, Ser. No. 231,734

16 Claims. (Cl. 325—56)

This invention relates to a diversity transmitting and receiving system. More particularly, it relates to a system using at least two transmitters in controlled phase relationship in which one or more transmitted signals of the same frequency are tagged by identifying modulation so that by using only one receiver, the received signals may be used to adjust and control the phase of an identified transmitted signal.

Radio signals are almost always subject to fading. This may occur because of movement of the ionosphere, weather conditions, movement of antennas, or in troposcatter communications, by disturbances in the upper atmosphere which scatter the signals.

Diversity is commonly used for receiving in such communications systems to control fading. For present purposes, fading may be said to include short time variations in the characteristics of a received signal where the effective propagation medium is moving, unsteady, time varying and, in general, producing different propagation paths having different characteristics.

Diversity systems require a set of independent received signals with differing (diverse) fading characteristics so that the fades of one signal do not coincide with that of the others. Space diversity employs separate receiving antennas for each signal of the set since the phase amplitude variations are statistically independent over differing paths. Frequency diversity uses several samples of the same signal transmitted at different frequencies taking advantage of the fact that fading characteristics are strongly affected by frequency. The diverse signals received are combined to produce an improved output signal.

Early diversity systems used switching to select the strongest signal from the set of receivers. Later, diversity combining was introduced using a weighted sum of a set of received signals. In predetection combining, the signals received in separate antennas are adjusted to matching phase and added before detection to achieve a maximum effect. With the development of predetection combining, it became possible to use diversity combination before detection by adjusting the phase of the received signals so that the addition did not cause cancellation effects.

Prior systems have also utilized two transmitters to transmit diverse signals of different frequencies, each of which is subject to selective fading and receivers to combine such signals to achieve improved performance. However, such systems require two receivers or receiving circuits; also the performance of such systems varies continuously because of fading which does not allow optimum combining continuously.

An object of my invention is to provide a diversity transmitting system which provides continuous optimum phasing of the received signals.

A further object of my invention is to provide a communication system utilizing diversity transmitting in which the phase between transmitted signals is continuously adjusted to achieve optimum receiver signals.

Another object of my invention is to provide a diversity transmitting system utilizing a single receiver in which the phase between transmitted signals is continuously adjusted to achieve optimum received signals.

Still another object of my invention is to provide a communication system utilizing diversity transmitting in which one or more of the transmitted signals are marked or tagged so that the phase relationship between the received signals can be sensed in reference to the tagged signal and the phase relationship between the transmitted signals is adjusted in accordance with the sensed phase relationship.

Yet another object is to provide a more efficient communication system which continuously operates at relatively lower transmitted power levels than conventional systems.

Another object of my invention is to provide a diversity transmitting system providing a more efficient communication system which continuously operates at a relatively low transmitting power level utilizing predetection combining and providing optimum phasing of combined signals.

Briefly, my invention comprises a communication system using two or more transmitters in controlled phase relationship feeding individual antennas to achieve array-gain or a diversity advantage and the use of identifying modulation applied to at least one transmitter, which permits the individual transmitted signals to be recognized in the composite received signal. The receiver output can be used to adjust or control the transmitter phasings to optimize the received composite signal. The optimum phasing may be time-varying (because of time varying fading characteristics) and the received signal can be utilized to provide a feedback control signal to continuously adjust the phase of at least one transmitted signal for optimum phasing in the received combined signal.

While the propagation medium may be time varying, it is substantially linear so that the received signal from a group of transmitters will be the sum of the components received from each of the transmitters, with no non-linear interaction effects. The received signal will be a maximum when the phasing of each transmitted signal is adjusted so that the received signals from each transmitter are in phase at the receiving point.

The above mentioned and other features and objects of this invention and the manner of attaining them will become more apparent and the invention itself will be best understood by reference to the following description of an embodiment of the invention taken in conjunction with the accompanying drawings, in which FIGURE 1 is a block diagram of my novel invention;

FIGURES 2 and 3 are explanatory diagrams illustrating the operation of my invention;

Figure 1:
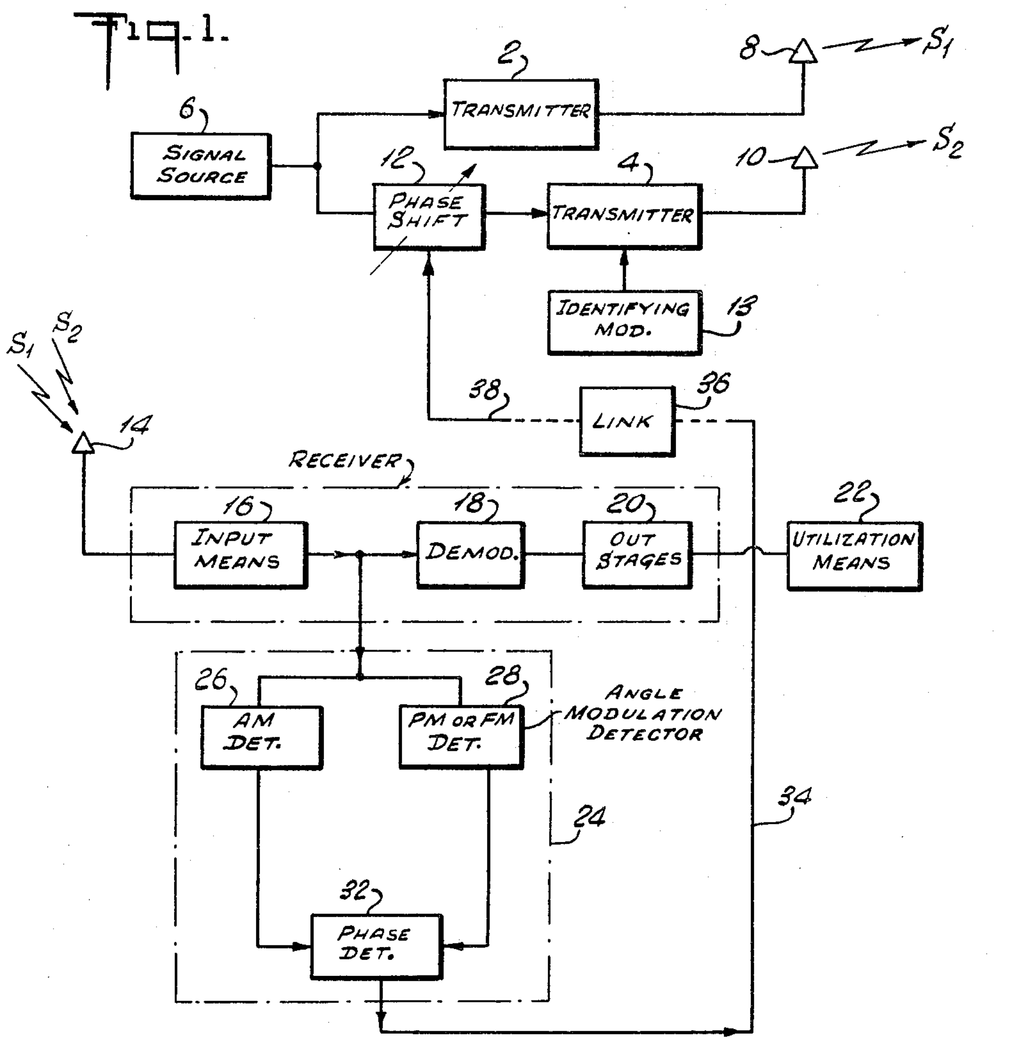

Referring now to FIGURE 1, there is shown a diversity transmitter means comprising transmitters 2 and 4. A common signal source 6 applies energy to each of the transmitters and the output of each transmitter is applied to separate antennas 8 and 12 which transmit signals S1 and S2 respectively. The carrier signal produced from signal source 6 will contain the information modulation as employed conventionally. Applied to one of the transmitters 4 is a source of identifying modulation 13 which marks or tags the signal S2 to distinguish it from S1. A phase shift element 12 is connected in the channel carrying S2 to vary the phase of the carrier signal. However, phase shift means 12 could be inserted in the other transmitting channel. An array of transmitters may be used instead of the two just shown and those skilled in the art can apply the compensating principles described herein to such systems.

The identifying modulation may take any character such as phase modulation, frequency modulation or amplitude modulation. However, in the preferred embodiment, phase modulation is employed.

The receiver means comprises a single antenna 14 which receives both signals S1 and S2. The signals S1 and S2 are simultaneously coexistent in the transmitting medium and the output from antenna 14 is the sum of S1 and S2 since the propagation medium is substantially linear. Conventional input means is shown at 16 and the combined signal received by the antenna is demodulated at 18 to detect the information. Conventional output stages and utilization means 20 and 22 are shown to complete the system.

It is the essence of this invention to provide signals S1 and S2 of the same frequency, subject to diversity fading, which are received in phase with each other by a single antenna 14. However, the correction for any phase shift error is applied by means of phase shift element 12 in one of the transmitting channels.

The combined received signal is applied to an error detecting circuit 24 which is positioned before the demodulator 18. As shown, the correcting means comprises a parallel AM detector 26 and an angular modulation detector 28. When the identifying modulation is phase modulation, detector 28 preferably should be a PM detector. If an FM detector 28 is used, then an additional 90° phase shift element 30 should be employed. Conversely, if the identifying modulation is frequency modulation, then preferably detector 28 should be an FM detector. However, if a PM detector is used in the case in which the identifying modulation is FM, then the 90° phase shift element 30 should be employed. A difference in phase between received S1 and S2 signals (the error) is therefore sensed by phase detector 32 which produces a correcting signal over lead 34 which is applied to a linking means 36 which in turn transfers a control signal over lead 38 to adjust the phase shift means 12.

Linking means 36 may take any one of conventional forms and may comprise essentially a conductor which couples phase detector 32 and phase shift means 12 or may comprise a separate transmitting and receiving system having transmitting means and receiving means suitable to detect the control signal appearing on lead 34 representing a difference in phase between the received signals S1 and S2. The control signal may be employed as a modulating signal and in such case, detecting means will recover the control signal before application to the phase shift means.

Figure 2A:
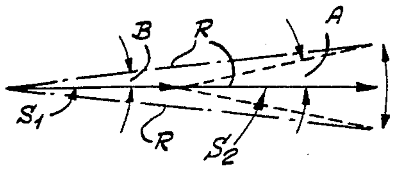
Figure 2B:
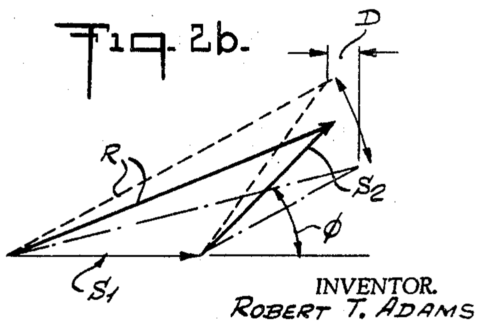

The operation of the system may be explained by referring to FIGURES 2*a* and 2*b*. Assuming that the identified modulation is phase modulation, the signals S1 and S2 received at antenna 14 are added together to produce the resultant indicated by the letter R. Since S2 has a varying phase caused by the identifying modulation as illustrated, it is apparent that the resultant R will also have a component of phase modulation and will also oscillate, although at a slower speed than signal S2. However, when signals S1 and S2 are in phase as illustrated in FIG. 1, S2 rotates A degrees causing R to rotate B degrees. The identifying modulation produces only a very small angular change and the component of R along the X axis is substantially constant, representing no amplitude modulation. However, when signals S1 and S2 are out of phase by an angle $\phi$ as illustrated in FIGURE 2*b*, resultant R is oscillating within the angle prescribed by the identifying modulation; in this case, R has a component along the X axis which varies in length by the distance D. Thus, when the two signals are out of phase, the variation in the resultant along the X axis essentially produces amplitude modulation.

AM detector 26 is utilized to determine the presence of AM modulation and then to compare it with the reference signal—the identifying modulating signal—which is extracted by the PM or FM detector 28.

Phase detector 32 is then utilized to determine the difference in phase between the detector signals. Phase detector 32 is conventional and produces a signal depending upon the presence of a phase difference. The output of the phase detector consists of a control voltage which is used to control the continuous phase shift means 12. A suitable phase detector which multiplies the product of the AM and phase modulation components, known as a cross-correlation detector, produces a D.C. signal whose polarity represents the sense of the phase difference and whose magnitude is approximately proportional to the magnitude thereof. The control voltage produced and phase shift 12 are arranged such that the phase shifter will be driven in one direction in response to a negative D.C. signal to bring the signals S1 and S2 in phase coincidence or will be driven in the other direction when there is a positive D.C. voltage.

Figures 3A, 3B, 4:
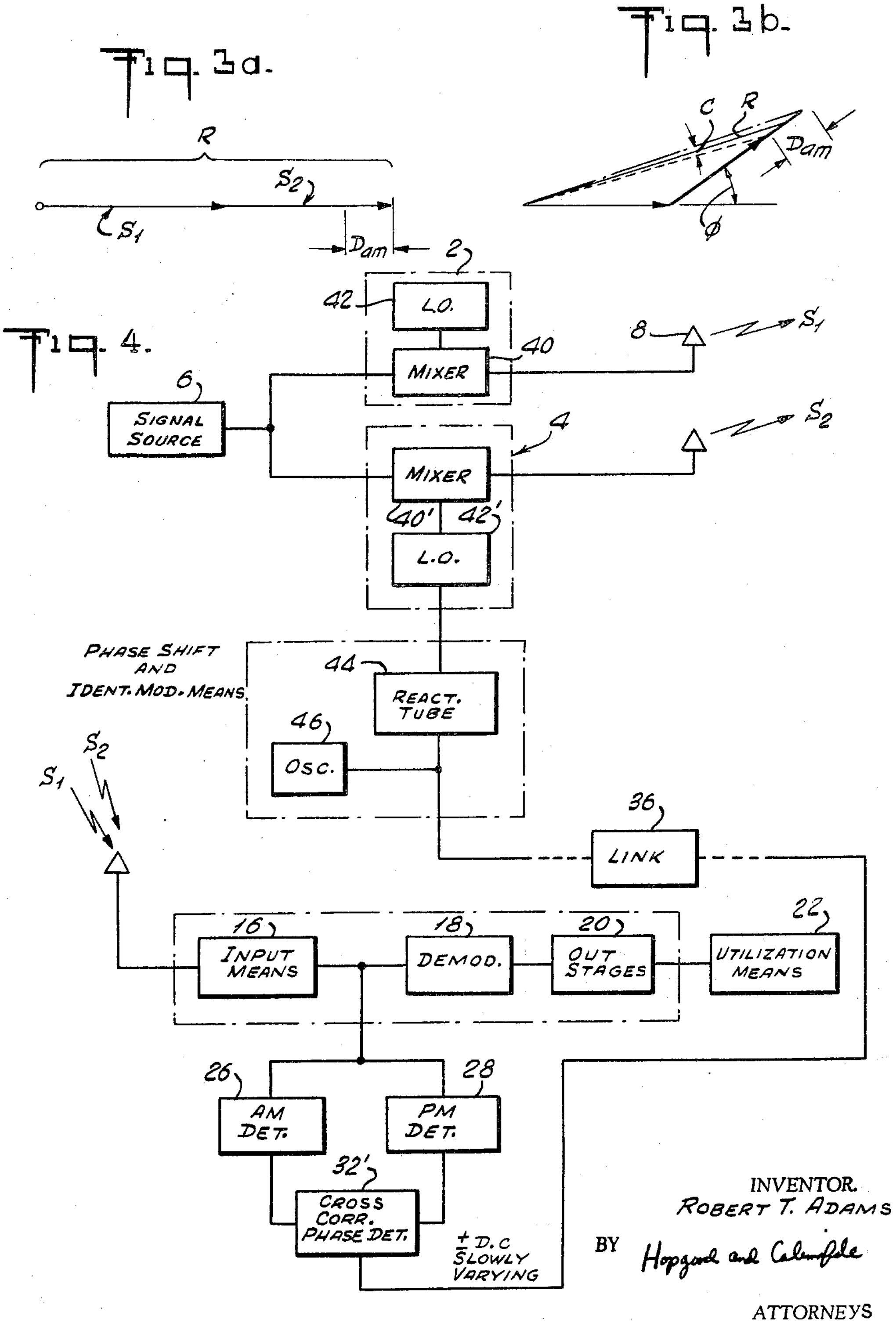
FIGURE 4 is a more detailed diagram showing one embodiment of my invention.

Amplitude modulating identification may also be used. Reference may now be made to FIGURES 3*a* and 3*b* as well as FIGURE 1 in which identifying modulating means 13 produces amplitude modulation. When the signals S1 and S2 are received in phase, as illustrated in FIGURE 3*a*, the resultant will be an amplitude modulated signal but will have no component of angular modulation. The excursion of the amplitude modulation is indicated by the identifying symbol $D_{am}$. When the signals are out of phase, the amplitude variation $D_{am}$ of S2 causes a phase variation in the resultant R such that it oscillates over the small angle C (FIGURE 3*b*). Thus, the detectors 26 and 28 produce signals having a phase difference, only in this case, the reference signal is the amplitude modulating signal. A control signal is obtained from phase detector 32 and utilized as described previously.

A more detailed preferred embodiment of the invention is shown in FIGURE 4 in which the same numerals refer to previously identified components. Transmitters 2 and 4 comprise mixers 40, 40' and local oscillators 42, 42', respectively. The frequency of oscillation of 42' is controlled by a reactance tube 44, the capacitance of which is caused to vary by the signal received from oscillator 46 and by the control signal from linking means 36. If the signals S1 and S2 are received in phase, the output from cross-correlation phase detector 32' is 0. As a result, the phase of the transmitted signal S2 is caused to vary in accordance with that of oscillator 46. However, if the signals are out of phase, the D.C. signal produced by detector 32' causes the capacitance of the reactance tube 44 to be higher or lower than its nominal value causing the frequency of local oscillator 42' to be higher or lower than its nominal value, which results in a gradual phase shift of S2.

My communication system is efficient and practical and obtains significant power advantages. I am able to transmit at lower power levels to obtain the same receiver performance as compared to transmission with a single signal. Using a single transmitter, approximately 10 to 1000 times the power required of my system would be needed for comparable receiver performance. By providing continuous optimum receiver performance, I am able also to divide the transmitted signal strength by transmitting from two transmitters. This provides an additional economy since the total power transmitted is less by a factor of $1/\sqrt{2}$, assuming a given signal strength. This additional advantage is, however, small compared to the advantage obtained by transmitter diversity.

It may also be recognized that more than two transmitters may be used in which case all but one transmitter will have separate identifying modulation imposed on the respective transmitted signals.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. A process for diversity communication comprising transmitting at least two signals through a propagation medium by which said signals have different fading characteristics, identifying at least one of said signals by imposing identifying modulation thereon, receiving said signals including the step of combining said received signals, determining the relative phase of said received signals by detecting and comparing amplitude and phase-varying components of frequency corresponding to said identifying modulation and continuously controllably adjusting the phase of at least one of said transmitted signals in response to a determined relative phase to reduce said phase to minimum.

2. In a communication system using two or more transmitters in controlled phase relationship, the use of identifying modulation applied to one or more but not all transmitted signals so that the received signals may be combined in a manner so that individual transmitted signals may be recognized in the composite signals, additively receiving such signals and using said received signals to controllably adjust the phasings of the transmitted signals in accordance with a modulation characteristic of the said received signal produced by said identifying modulation component when said received signals are out-of-phase to optimize the composite received signals.

3. A communication system comprising diversity transmitting means producing at least two signals in controlled phase relationship, means to produce identifying modulation, means for modulating at least one of said signals with said identifying modulation, phase means to adjust the phase in at least one of said transmitted signals, single receiving means including means to determine the relative phase of said signals using the identifying modulation as a reference, means coupled to said receiving means and responsive to said relative phase to control said phase adjusting means, said control means producing a phase shift in said one transmitted signal when said relative phase differs from a predetermined amount when said relative phase is not zero.

4. A system of diversity communication comprising means transmitting at least two signals through a propagation medium by which said signals have different fading characteristics, means for identifying at least one of said signals by imposing identifying modulation thereon, means for receiving said signals including single antenna means for combining said received signals to provide a resultant output signal whereby when said signals are out-of-phase, modulation of said output signal in accordance with the out-of-phase relation occurs, means for determining the relative phase of said received signals including means to detect the modulation component representing out-of-phase relationship and control means for continuously controllably adjusting the phase of at least one of said transmitted signals in response to a determined relative phase to reduce said phase to minimum, said control means varying in accordance with the output of said detection means.

5. The system of claim 4 in which said control means include separate AM and phase-varying detectors, means coupled to said single antenna means to couple the resultant signal to said detector, and means to demodulate said resultant signal to utilize the informational content thereof.

6. The system of claim 4 in which said control means includes phase detecting means producing a control signal in accordance with said relative phase.

7. The system of claim 6 including linking means to couple the control signal to said phase shifting means.

8. The system of claim 7 in which said linking means includes transmitting and receiving means and said control signal modulates a carrier signal.

9. The system of claim 8 in which said identifying modulation is angular modulation.

10. The system of claim 8 in which said identifying modulation is amplitude modulation.

11. In a communication system comprising two transmitters for transmitting first and second signals, means applying identifying modulation of said first signal, single receiving means to provide an output signal in accordance with the sum of the first and second signals as received, said output signal constituting a composite signal, said receiving means including means responsive to said output signal to controllably adjust the phasing of one of the transmitted signals to optimize the composite output signal, said responsive means including means responsive to a modulation component of said output signal representing out-of-phase relationship of the transmitted signals at the receiving means.

12. The system of claim 11 in which said responsive means include separate amplitude modulation and angular modulation detectors to detect the respective identifying modulation and the said modulation component representing out-of-phase relationship, the amplitude modulation detector detecting the identifying modulation, and said angular modulation detector detecting the said modulation component when the identifying modulation is amplitude modulation, and when the identifying modulation is angular modulation, the said angular modulation detecting the identifying modulation and the amplitude modulation detector detecting the said modulation component.

13. A process for diversity transmission and reception in which signals are transmitted into a medium which is substantially non-linear but which produces fading effects on the said signals comprising the steps of transmitting a first information signal into said medium, transmitting separately and simultaneously a second information signal into said medium, applying an identifying modulating signal to one of said signals, receiving said first and second signals to produce a resultant signal, whereby said resultant signal is amplitude and phase modulated when said first and second signals are received out-of-phase, detecting the amplitude modulation component of the said resultant signal, detecting the phase modulation component of said resultant signal, comparing the two detected signals to provide a control signal and varying the phase of one of said transmitted signals in accordance with the said control signal.

14. A system for diversity transmission and reception in which signals are transmitted into a medium which is substantially non-linear, comprising a first transmitter to transmit a first signal having informative content, a second transmitter to transmit a second signal corresponding to said first signal, modulation means for applying an identifying modulation signal to said first signal, single receiver means to receive said first and second signals to produce a resultant signal, information detecting means in said receiver means to utilize the information content of said resultant signal, whereby said information content of said resultant signal is greatest when said first and second signals are in phase, and whereby when said signals are out-of-phase said resultant signal has AM and phase-varying components of a frequency dependent upon said identifying modulation signal,
means to detect said AM and phase-varying components, comparison means to compare said detected AM and phase-varying components,
and means responsive to said comparison means to continuously vary the phase of one of said transmitted signals.

15. A communication system comprising
diversity transmitting means producing at least two signals in controlled phase relationship,
means for imposing identifying modulating signals on one or more but not all of said signals,
phase means to adjust the phase of one of said transmitted signals,
receiving means to combine said signals and including means to determine the relative phase of one of said signals relative to said identifying modulating signals by comparing a modulation component of the combined signals produced by said identifying modulation component when the said received signals are out-of-phase,
means coupled to said receiving means and responsive to said relative phase to control said phase adjusting means.

16. The system of claim 15 in which said identifying modulating means comprises phase modulating means.

References Cited by the Examiner

UNITED STATES PATENTS

| | | | |
|---|---|---|---|
| 2,505,266 | 4/1950 | Villem | 325—56 |
| 2,536,255 | 1/1951 | Bedford et al. | 325—58 |
| 2,599,643 | 6/1952 | Kell | 343—208 |
| 2,861,177 | 11/1958 | Dishal et al. | 325—58 |

OTHER REFERENCES

Altman: Electrical Communication, June 1956, pp. 161–164.

DAVID G. REDINBAUGH, *Primary Examiner.*